United States Patent [19]
Heinzer

[11] 3,738,081
[45] June 12, 1973

[54] DEVICE FOR UNITING PARALLEL AND OPPOSITELY DISPOSED WALL PORTIONS OF A TUBE BY TRANSVERSE WELDING SEAMS

[75] Inventor: Hans Heinzer, Beringen, Switzerland

[73] Assignee: Schweizirische Industrie-Gesellschaft, Zurich, Switzerland

[22] Filed: June 3, 1971

[21] Appl. No.: 149,592

[30] Foreign Application Priority Data
Apr. 16, 1971 Switzerland.......................... 5579/71
June 8, 1970 Switzerland.......................... 8584/70

[52] U.S. Cl.................................... 53/180, 53/388
[51] Int. Cl............................................. B65b 51/30
[58] Field of Search .................... 53/182, 180, 379, 53/388; 93/9, 14, 31, 77 R, DIG. 1

[56] References Cited
UNITED STATES PATENTS

| | | | |
|---|---|---|---|
| 3,513,629 | 5/1970 | Hoagland et al..................... | 53/182 |
| 2,950,588 | 8/1960 | Gausman.......................... | 53/182 X |
| 2,831,302 | 4/1958 | Jensen et al....................... | 53/182 X |
| 3,358,419 | 12/1967 | Bjork et al............................ | 53/180 |
| 3,543,478 | 12/1970 | Von Brecht et al.................. | 53/182 |
| 3,006,121 | 10/1961 | Omori................................... | 53/180 |

*Primary Examiner*—Andrew R. Juhasz
*Assistant Examiner*—Horace M. Culver
*Attorney*—Singer, Stern & Carlberg

[57] ABSTRACT

The invention relates to article packaging machines and particularly to a device for connecting oppositely disposed wall portions of a lengthwise moving flexible tube containing rather high articles in axially spaced relation by transverse welding seams which are produced by continuously moving welding dies between each article in the tube. In addition to these welding dies the device is provided with two symmetric gusset folders which enter transversely into the space between the dies and the adjacent ends of the spaced articles during the time interval at which the dies press the oppositely disposed wall portions together for engaging the tube material and folding it smoothly against the end faces of the articles during the continuous lengthwise movement of the tube; in fact, the gusset folders do not only move transversely back and forth at right angles to the tube, but also move lengthwise with the tube.

3 Claims, 12 Drawing Figures

PATENTED JUN 12 1973

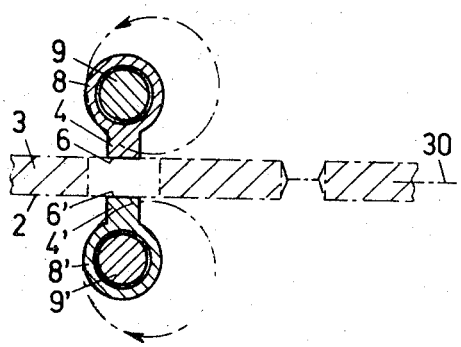
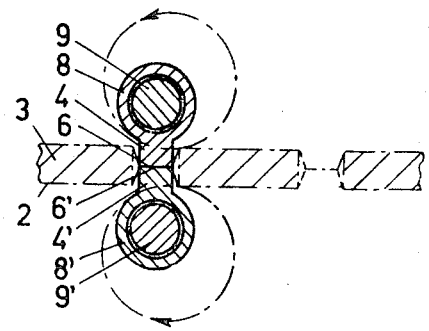
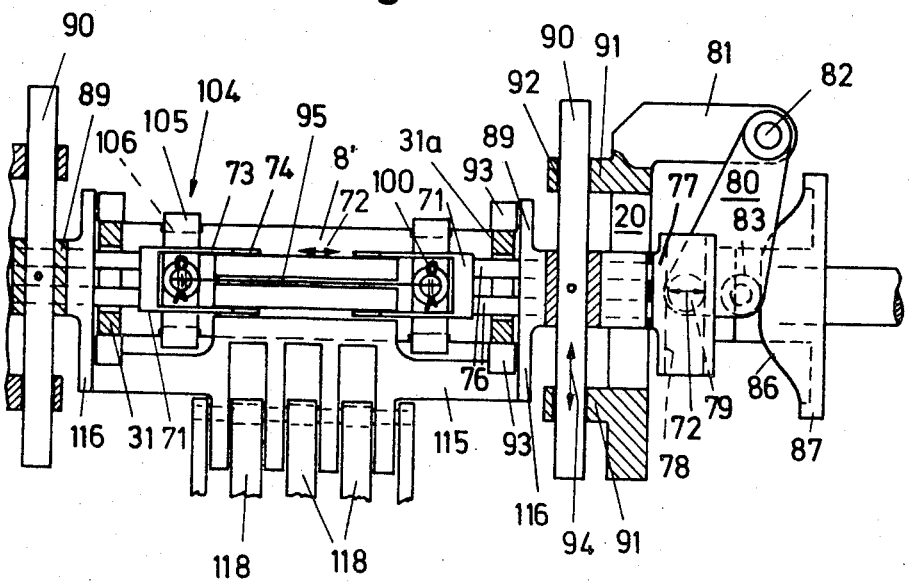

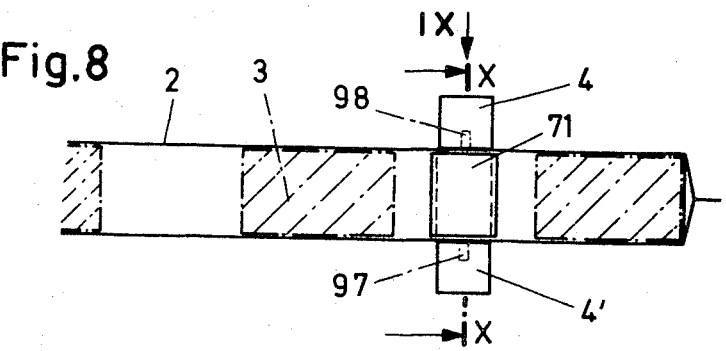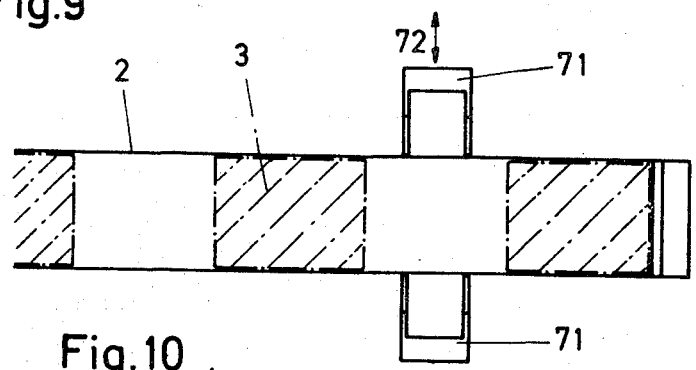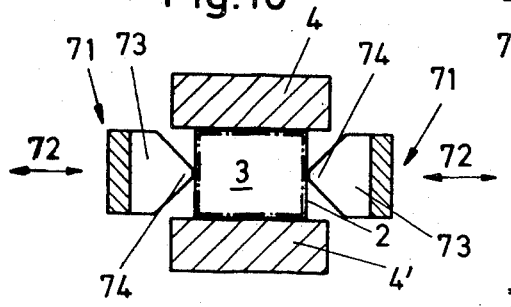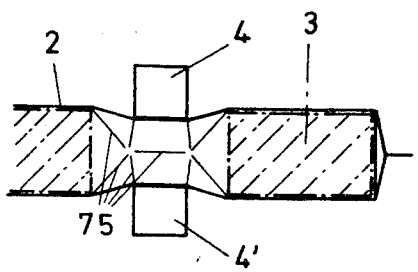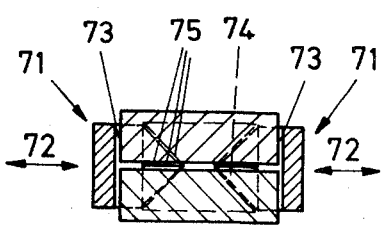

DEVICE FOR UNITING PARALLEL AND OPPOSITELY DISPOSED WALL PORTIONS OF A TUBE BY TRANSVERSE WELDING SEAMS

The invention relates to a device for connecting oppositely disposed wall portions of a flexible tube by transverse welding seams produced by two oppositely arranged continuously movable welding dies which at uniform intervals press the oppositely disposed wall portions of the flexible tube upon each other and in which two symmetrically disposed gusset folders, when the welding dies enter into the space between two articles in the tube and engage the upper and lower wall portions, move the associated side wall portions toward each other in order to fold these side wall portions against the end faces of the articles in the tube. Such a device may be employed for continuously producing packages in such manner as has been described, for instance, in the U.S. Pat. No. 3,007,295. The employment of gusset folders in cases in which the packages have a substantial height is already known. However, up to now, a considerable difficulty was encountered in that the movement of the gusset folders together with longitudinal movement of the tube on one hand and the movement of the welding dies on the other hand had to be coordinated.

It is an object of the invention to obtain a satisfactory coordination of the movement of the parts which perform the mentioned operations.

The present invention provides means which insure that the gusset folders, at least during the time interval in which the same act upon the tube, are moved in the direction of the tube, so that they remain always aligned with the welding dies.

The drawings illustrate diagrammatically and by way of example a few embodiments of the device of the invention.

In the drawings:

FIGS. 3 and FIG. 4 illustrate each a vertical sectional view similar to FIG. 1, except that each figure illustrates a different operating phase of the welding dies;

FIG. 7 is a vertical sectional view along line VII—VII of FIG. 5;

FIG. 8 illustrates diagrammatically a folding operation;

FIG. 9 is a top elevation view in the direction of the arrow IX in FIG. 8;

FIG. 10 is a cross-sectional view along line X—X of FIG. 8;

FIG. 11 illustrates a figure similar to FIG. 8, but in a position briefly after the start of the folding operation; and FIG. 12 illustrates a figure similar to FIG. 10, but illustrates the end of the folding operation.

Figure 1:
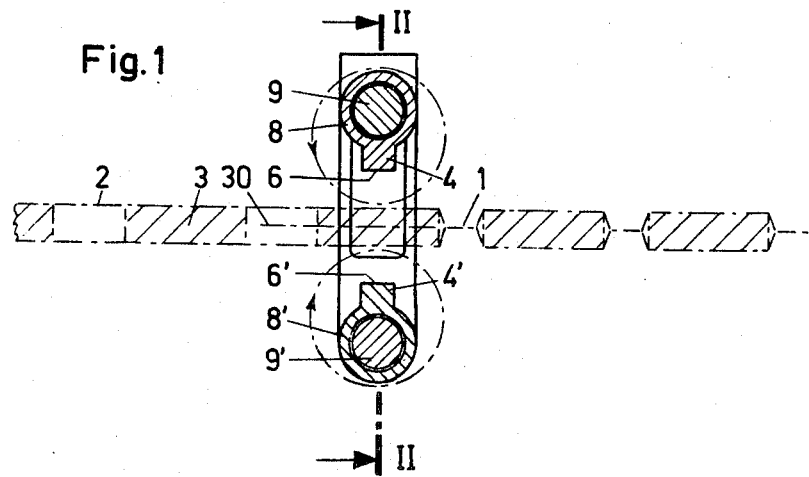
FIG. 1 illustrates a vertical sectional view of the welding die device of a first embodiment of the invention along the lineI—I of FIG. 2, however, a few details have been omitted.
Figure 2:
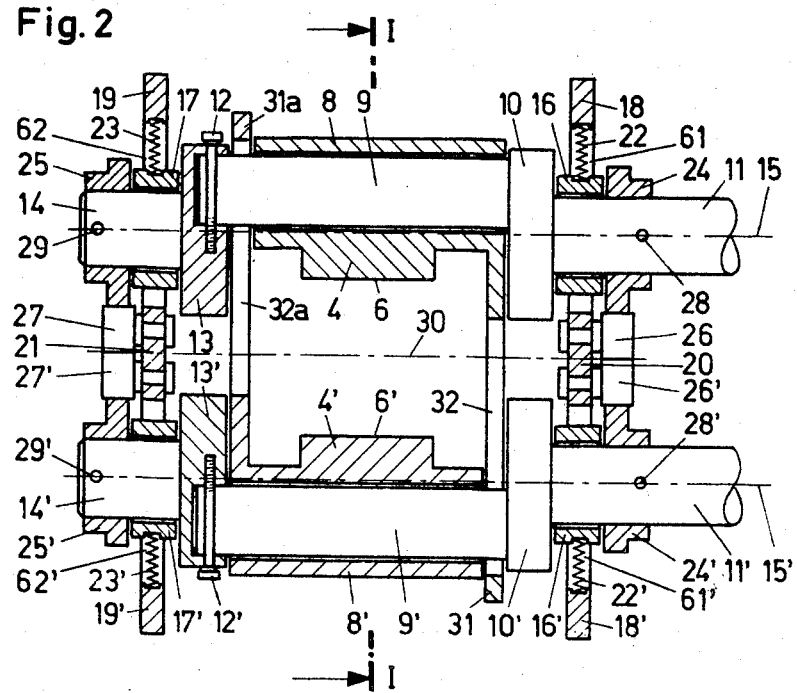
FIG. 2 illustrates a vertical sectional view along line II—II of FIG. 1.

The welding device illustrated by way of example in FIGS. 1 and 2 is employed for producing transverse welding seams 1 for connecting oppositely disposed wall portions of a continuously axially forwardly moving tube 2 made of a weldable plastic. This tube 2 contains articles 3 which are uniformly spaced from each other in the tube. The articles may consist, for instance, each of a number of stacked biscuits. The articles 3 are to be packed in the tube material and this requires the formation of the transverse welding seams 1 disposed in the empty intervals between the articles 3. After this welding operation follows a cutting of the tube 2 within the range of the seams 1. In what manner the tube is made from a foil of plastic or from paper provided with a coating of thermo-plastic weldable material and is supplied with the articles to be packed is, for instance, disclosed in the previously mentioned U.S. Pat. No. 3,007,295. This known packaging device is provided for the production of spaced welding seams with two oppositely rotating segment-shaped heated rollers provided with dies. These dies, as already indicated, engage each other theoretically along a transverse line when the tube is squeezed together, and this engagement takes place for only a very short time period. It is, however, of interest, in order to produce a good welding seam, to provide a longer contact period and also a relatively wide transverse strip. In order to obtain such an improved operation, the device of the present invention comprises two superimposed welding dies 4 and 4' provided with flat rectangular welding surfaces 6 and 6' which face each other, whereby the dies in the position of FIG. 4 squeeze the tube 2 together and by means of the effect of heat, weld together the two wall portions of the tube which engage each other.

The welding dies 4 and 4' are so guided that their welding surfaces 6 and 6' periodically approach each other and move away from each other, and while doing this remain always parallel to one another. For this purpose, the upper welding die 4 is provided with a hub 8 which is mounted on a crank pin 9 which according to FIG. 2 is connected by a crank disk 10 fixedly with a driven crank shaft 11. The free end of the crank pin 9 is connected by a screw 12 with a second crank pin 9 is connected by a screw 12 with a second crank disk 13 which is disposed on a stub shaft 14, which latter comprises an extension of the crank shaft 11 whose geometrical axis is designated by 15.

The extended crank shaft 11, 14 is supported in two bearings 16 and 17 which are supported at the upper ends 18 and 19 of stationary frame legs 20 and 21 by means of pressure springs 22, 23. The pressure springs 22, 23 are disposed in slots 61 and 62 serving as a vertical guide for the bearings 16 and 17 in the frame legs 20 and 21. From below, the extended crank shaft 11, 14 is supported by means of two cams 24, 25 on two rollers 26 and 27 carried by the center portion of the stationary frame legs 20 and 21. The cams 24 and 25 are attached to the extended crank shaft 11, 14 by pins 28 and 29. The hub 8' of the lower welding die 4' is mounted in similar manner as the hub 8 of the upper welding die 4, but symmetrically with respect to the same and the horizontal center plane 30. There are also provided other lower parts arranged with similar arranged numerals provided with a prime (') and therefore a repetition of the description of these details at this time does not appear to be necessary.

The hub 8 is provided at the right end of FIG. 2 with a downwardly directed radial arm 31 which is provided with a longitudinal slot 32 in which engages the right-hand end of the crank pin 9'. Reversely, the hub 8' is provided at its left-hand end with an upwardly directed radial arm 31a which has a longitudinal slot 32a into which engages the left-hand end of the crank pin 9. As a result, the crank pins 9 and 9' in each of their positions by means of the radial guide arms 31a and 31, respectively, pivotally guide the oppositely disposed hubs 8 and 8', respectively, so that the rectangular welding faces 6 and 6' are always parallel to one another.

If the bearings 16, 17 and 16', 17' were stationary, the welding surfaces 6 and 6' could compress the tube 2 for only a very short time, namely, only in that position in which the oppositely disposed crank pins 9 and 9' have the smallest distance from each other when the cranks 11 and 11' are driven in opposite directions. However, owing to the yieldable support of these bearings 16, 17 and 16', 17' in an upward or downward direction, and owing to the shape of the cams 24, 25 and 24', 25', which engage the rolls 26, 27 and 26', 27', the welding period is now substantially extended. After the welding seams 1 have been produced, the packaged articles are separated from each other and the separated packages are deposited on a non-illustrated conveyor means, for instance, an endless conveyor belt.

The above described embodiment of the device of the present invention is very suitable for packaging of relatively flat articles. If, however, the dimensions of the articles to be packed become very large in the direction of movement of the welding dies 4 and 4', then certain difficulties may be encountered, because the walls of the tube 2 which are pressed by the welding dies in a direction transversely to the longitudinal direction of the tube, or transversely to the direction of movement of the tube 2 are longer than the corresponding transverse dimension of the article. During the packaging, it may happen that at the ends of the package the tube material will be irregularly folded beginning from the transverse seam to that portion of the tube which surrounds the article. It is, however, desired that the packing material should also be positioned as closely as possible against the ends of the article.

Figure 5:
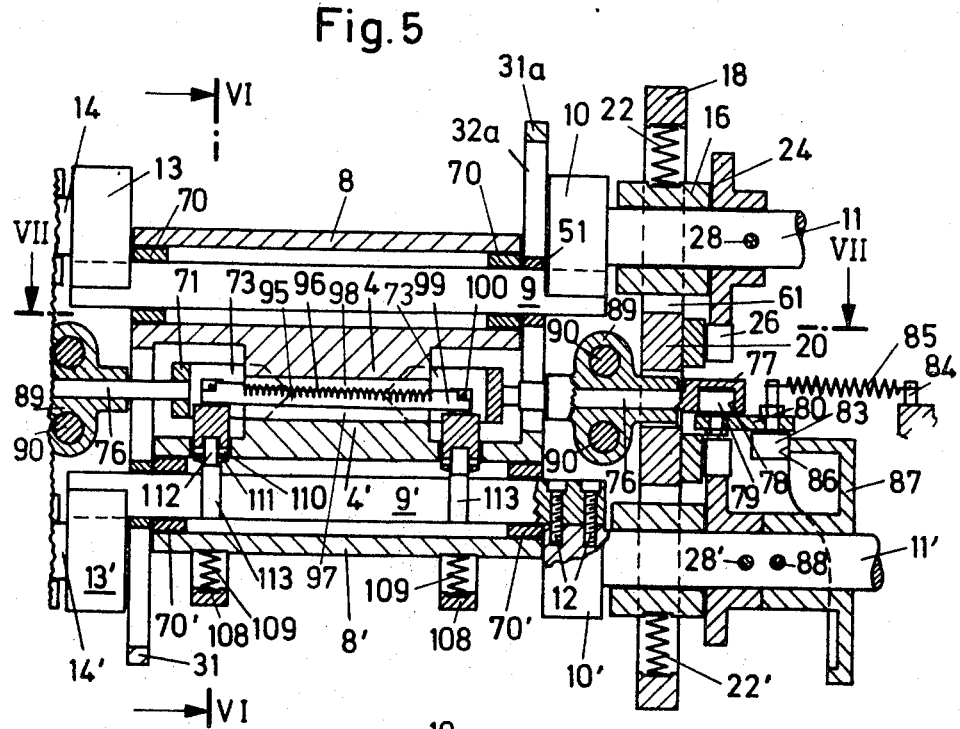
FIG. 5 illustrates a vertical sectional view of a second embodiment of the invention similar to FIG. 2.
Figure 6:
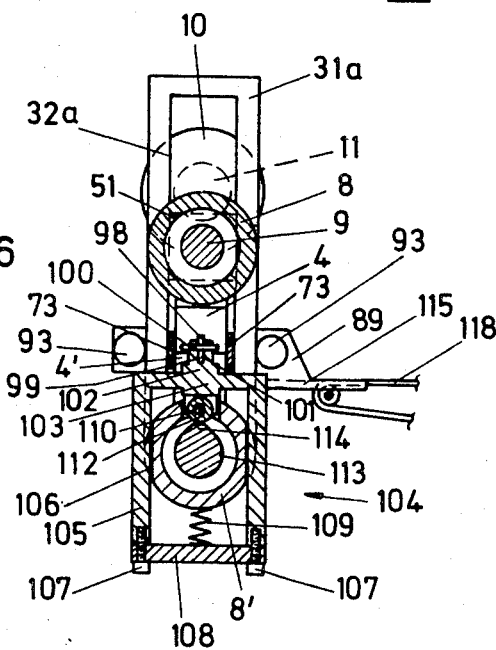
FIG. 6 is a vertical sectional view along line VI—VI of FIG. 5.

Accordingly, FIGS. 5, 6 and 7 disclose an embodiment of the device of the invention in which also high articles may be cleanly packed by eliminating any difficulties in the operation of the knife.

In the FIGS. 5, 6 and 7, the same parts used also in the preceding embodiment, such as FIG. 2, are provided with the same reference numerals. Furthermore, certain parts on the left-hand side of the FIGS. 5 and 7 have been omitted because they are constructed in the same manner as the parts illustrated at the right-hand side of these Figures. The welding device is again provided with two superimposed welding dies 4 and 4', and the hub 8 of the upper welding die 4 is again mounted on a crank pin 9 which by means of the crank disk 10 is connected with the crank shaft 11 supported in the vertically movable bearings 16. In the present case, there are arranged between the hubs 8, 8' and the crank pins 9, 9' the additional distance-producing bearing rings 70, 70'. Without repeating a description of all the individual parts which already have been used in the description of the device illustrated in FIG. 2., it should be noted that at this time a folding device is also provided for folding the tube material prior to the formation of the transverse seam.

In order to explain the construction of this folding device, attention is now directed to FIGS. 8 to 12 which also explain in which manner the folding device cooperates with the welding dies 4 and 4'.

According to the FIGS. 8 to 10 the flexible tube 2 has inserted therein, a number of longitudinally spaced articles 3 of substantial height. In the empty spaces of the tube 2 between the high articles 3 are not only arranged the two welding dies 4 and 4', but along two symmetrically constructed U-shaped gusset folders 71 which in the direction of the double arrow 72 are movable back and forth. The two legs of the U-shaped gusset folder 71 consist of two thin plates 73 which are disposed in planes at right angles to the tube 2 and have each at their free ends a centrally located symmetrical triangular projection 74. When now the gusset folders 71 are both simultaneously moved toward each other together with the welding dies 4 and 4' for engaging the tube 2, then the tube is deformed into regular folds.

FIG. 11 illustrates the folds 75 which are produced at the beginning during the inward movement of the gusset folders 71, but for the sake of clearness, the gusset folders 71 themselves have been omitted from this figure.

FIG. 12 illustrates the final folding of the tube when the welding dies 4, 4' have reached their welding position. The gussets of the tube material which are formed by the folds 75 are now disposed smoothly one upon the other, namely against the face ends of the article 3 in the tube 2. The length of the transverse seam which is formed by the welding dies 4, 4' is not only made longer, but is equal to the width of the articles 3.

According to FIGS. 5 to 7, each gusset folder 71 is attached at one end to two horizontal parallel control rods 76, the other end of which is attached to a control head 77 which transmits to the rods 76 a reciprocating movement indicated by the double arrow 72. Since the welding dies 4, 4' during the welding operation—as previously explained— advance with the tube 2, it is obvious that the gusset folders 71 also have to follow this movement. For this purpose, the control head 77 is provided with a groove 78 which extends parallel to the feeding direction of the tube 2. In this groove 78 engages a roller 79 which is mounted on a lever 80. This lever 80 is provided with an additional roller 83 and is pivotally connected at 82 to an arm 81 extending outwardly from the frame leg 20, as shown solely in FIG. 7. The roller 83 by means of a tension spring is kept in engagement (FIG. 5) with a cam edge 86 of a cam 87. This cam 87 is attached with a pin 88 to the lower crank shaft 11'. These control rods 76 are slidably arranged in a carrier head 89 in which are mounted two parallel guide rods 90 extending parallel to the direction of movement, whereby these guide rods 90 are supported by inwardly directed projections 91 of the frame leg 20 in guides 92. The carrier head 89 is provided with two rollers 93 symmetrically arranged to the center line of the arm 31a on the hub 8' and engage the outer surface of the same.

The crank pin 9 is again guided in a longitudinal slot 32a of the arm 31a and now is movable over a slide block 51, so that the arm 31a always remains vertical and moves translatorily with the hub 8' whose horizontal movement is the same as that of the hub 8. The arm 31a transmits by means of the rollers 93 to the carrier head 89 a reciprocating movement which also is transmitted to the guide rod 90, as indicated by the double arrow 94. The carrier head 89 transmits this movement by means of the operating rods 76 to the control head 77 in whose groove 78 the roller 79 is slidable. At the same time the control lever 80 is pivoted, so that the roller 79 moves the control head 77 and therewith is also moved by means of the rods the gusset folder 71 in the direction of the double arrow 72.

On the left-hand side of the FIGS. 5 and 7, the respective frame leg and the parts on the same and on the exterior of the same are omitted. Nevertheless, these parts are symmetrically arranged in the zone described to be at the right-hand side of these figures. Obviously, in place of the crank shafts 11 and 11' are employed the stub shafts 14 and 14', whereby the stub shaft 14' operates the cam 87 mounted on the same.

A knife 95 with a saw-tooth cutting edge 96 for cutting the tube 2 in the center of the transverse seam 9 is movable in a groove 97 (FIG. 5) of the welding die 4'. This groove 97 is disposed opposite a groove 98 arranged in the welding die 4. The off-set right-hand end 99 of the knife 95 is attached outside of the welding die 4' by means of a split pin 100 in a slot 101 of an upwardly projecting extension 102 on the upper side 103 of a rectangular frame 104. Two vertical sides 105 of this frame 104 are guided in grooves 106 of the hub 8'. The lower frame side 108 is detachably attached by screws 107 to the lower ends of the vertical sides 105 and is urged downwardly by a pressure spring 109 engaged by the hub 8'. Furthermore, by means of a pin 110, a roller 112 is attached to two downwardly extending projections 111 of the upper end side 103 and is kept in engagement with the cam 113 fixedly attached to the crank pin 9. This cam 113 has a single rather sharp projection 114. The left-hand end of the knife 95 designated by 99 is attached and mounted in the same manner as the right side end 99, so that a repetition of this part of the description is superfluous.

According to FIG. 6 the roller 112 has just engaged the projection 114. This means that the knife 95 is in its highest position and its cutting edge 96 has entered the groove 98 of the upper welding die 4, and has cut the tube 2 in the center of the transverse seam previously produced by the welding dies 4 and 4'. It is clear that with the exception of a small range of the projection 114, the roller 112 and therewith also the knife 95 will always be in the lowest position, so that the knife 95 is always on the bottom of the groove 97 in the welding die and cannot interfere with the movement of the tube 2 and of the articles therewith, independently of the height of the articles.

After the tube 2 has been cut in the center of the transverse seam 1, the completed package which has been separated from the tube comes to lie on a movable table plate 115 (FIGS. 6 and 7) which is attached to two downwardly projecting projections 116 of the two carrier heads 89 and always moves horizontally back and forth in the direction of the double arrow 94. The table plate 115 deposits the individual packages on endless conveyor belts 118.

It is obvious that the described welding devices may also be used without change to connect at regular distances two or even more than two superimposed bands moving in longitudinal direction to connect the same with transverse seams. It should also be noted that the term "welding" is to be understood in its widest sense, and that under certain circumstances bands or the oppositely disposed wall parts of a tube, when provided with certain surface layers, may be connected by a simple pressure by means of a so-called "cold welding."

Finally, the terms "vertical" and "horizontal" as well as "upper" and "lower," as used in the present description and the claims, relate solely to the devices illustrated in the drawings which show the general position of the parts. Finally the welding surfaces 6 and 6' describe in the embodiments and which have plane rectangular surfaces, may also have any other shape. The welding surfaces may, for instance, have the shape of roof-edge surfaces with a V-shaped profile which extend transversely to the feed direction.

In operation, the machine of this invention provides transverse seams between adjacent articles which are to be packaged in a tube and further provides gusseting of the packages so as to provide a neat and compact fold. It is to be particularly noted that the welding dies 4 and 4' move together between the articles 3 within the tube 2, so as to seal transversely the tube thus providing individual package units. The mechanical motion of the dies 4 and 4' is such that they do not merely momentarily engage, but are provided through the means of the cams 24, 25, 24', 25' with a movement which holds the dies together for a time sufficient to make a complete and positive weld of the tube.

Furthermore, it is to be realized that the gusset folders 71 move in synchronism with the welding dies such that they provide the gussets in the side of the tube as illustrated in FIG. 12 and then move outwardly before the dies come together, so that the dies can provide sealing of the tube.

What I claim is:

1. A device for connecting the oppositely disposed wall portions of a lengthwise moving tube containing axially spaced articles by transverse welding seams, comprising two oppositely disposed welding dies which perform a translatory movement in a closed path and thereby press the oppositely wall portions of the tube between said articles in regular intervals one upon the other, and two symmetrical gusset folders for folding the tube material disposed between the ends of the articles in the tube and the welding dies, when the latter have pressed the tube together, against the ends of the articles, wherein the improvement comprises means for acting upon said gusset folders at least during the time interval at which the same engage the tube in such manner that they move in the direction of the tube movement and thereby remain in alinement with said welding dies, including means actuated by at least one of said welding dies for causing said gusset folder to move with said lengthwise moving tube, including crank shafts for operating said welding dies, control cams on said crank shafts operatively connected with said gusset folders for moving the same at right angles to the lengthwise movement of said tube back and forth, and hubs on cranks of said crank shafts, and said hubs being each provided with an outwardly extending arm connected with a carrier head for moving said gusset folders back and forth in the axial direction of said lengthwise moving tube.

2. A device for connecting the oppositely disposed wall portions of a lengthwise moving tube containing axially spaced articles by transverse welding seams, comprising two oppositely disposed welding dies which perform a translatory movement in a closed path and thereby press the oppositely wall portions of the tube between said articles in regular intervals one upon the other, and two symmetrical gusset folders for folding the tube material disposed between the ends of the article in the tube and the welding dies, when the latter have pressed the tube together, against the ends of the articles, wherein the improvement comprises means for acting upon said gusset folders at least during the time interval at which the same engage the tube in such manner that they move in the direction of the tube movement and thereby remain in alinement with said welding dies, including means actuated by at least one of said welding dies for causing said gusset folder to move with said lengthwise moving tube, including crank shafts for operating said welding dies, control cams on said crank shafts operatively connected with said gusset folders for moving the same back and forth at right angles to the lengthwise movement of said tube, and hubs on cranks of said crank shafts, said hubs being each provided with an outwardly extending arm connected with a carrier head for moving said gusset folders back and forth in the axial direction of said lengthwise moving tube, and at least one control rod slidably supported in said carrier head which connects said gusset folders with a control head, a pivoted control lever operatively connecting said control head with said control cam and two rollers on said control lever, one of which engages a groove in said control head and the other of which engages said control cam.

3. A device according to claim 1, in which each gusset folder is provided with two spaced parallel plates arranged at right angles with respect to the axial direction of said tube, each of said plates being provided with a centrally disposed projection which will engage said tube when said gusset folders are moved toward said tube for performing the folding operation.

* * * * *